US008832348B2

(12) United States Patent
Cepulis et al.

(10) Patent No.: US 8,832,348 B2
(45) Date of Patent: Sep. 9, 2014

(54) METHODS AND SYSTEMS FOR AN INTERPOSER BOARD

(75) Inventors: Darren J. Cepulis, Houston, TX (US); Masud M. Reza, Cypress, TX (US); Michael Stearns, Cypress, TX (US); Chanh V. Hua, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 165 days.

(21) Appl. No.: 13/386,989

(22) PCT Filed: Jan. 29, 2010

(86) PCT No.: PCT/US2010/022563
§ 371 (c)(1),
(2), (4) Date: Jan. 25, 2012

(87) PCT Pub. No.: WO2011/093877
PCT Pub. Date: Aug. 4, 2011

(65) Prior Publication Data
US 2012/0131249 A1    May 24, 2012

(51) Int. Cl.
*G06F 13/36* (2006.01)
*G06F 1/26* (2006.01)
*G06F 1/20* (2006.01)
*G06F 1/18* (2006.01)

(52) U.S. Cl.
CPC *G06F 1/189* (2013.01); *G06F 1/26* (2013.01); *G06F 1/20* (2013.01); *G06F 1/206* (2013.01)
USPC .......................................................... 710/306

(58) Field of Classification Search
CPC ........... G06F 1/189; G06F 1/26; G06F 1/206; G06F 1/20; G06F 13/4027; G06F 13/4022; G06F 13/4059; G06F 13/404; G06F 13/4031

USPC .......................................................... 710/306
See application file for complete search history.

(56) References Cited

U.S. PATENT DOCUMENTS 5,130,636 A * 7/1992 Kumar et al. .................. 323/278
5,446,910 A * 8/1995 Kennedy et al. .............. 710/119
(Continued)

FOREIGN PATENT DOCUMENTS

| CN | 202563431 U | * 11/2012 | ................ G06F 1/26 |
| EP | 0341872 A3 | * 8/1990 | ............ H01R 11/01 |
| KR | 200302002 | 1/2003 | |

OTHER PUBLICATIONS

"NA9306547: Fault-Tolerant Bus Terminator for Concurrent Maintenance", Jun. 1, 1993, IBM, IBM Technical Disclosure Bulletin, vol. 36, Iss. 6A, pp. 547-550.*

(Continued)

Primary Examiner — Faisal M Zaman

(57) ABSTRACT

In accordance with at least some embodiments, a system (100) includes an aggregator backplane (124) coupled to a plurality of fans (120A-120N) and power supplies (122A-122N) and configured to consolidate control and monitoring for the plurality of fans (120A-120N) and power supplies (122A-122N). The system (100) also includes a plurality of compute nodes (102A-102N) coupled to the aggregator backplane (124), wherein each compute node (102A-102N) selectively communicates with the aggregator backplane (124) via a corresponding interposer board (130A-130N). Each interposer board (130A-130N) is configured to translate information passed between its corresponding compute node (102A-102N) and the aggregator backplane (124).

6 Claims, 3 Drawing Sheets

(56) References Cited

U.S. PATENT DOCUMENTS

| | | | |
|---|---|---|---|
| 5,473,757 A * | 12/1995 | Sexton | 700/2 |
| 6,069,576 A * | 5/2000 | Gwin | 341/112 |
| 6,105,088 A * | 8/2000 | Pascale et al. | 710/100 |
| 6,115,814 A * | 9/2000 | Lieber et al. | 713/2 |
| 6,320,771 B1 * | 11/2001 | Hemena et al. | 363/70 |
| 6,434,167 B1 * | 8/2002 | Quiring et al. | 370/493 |
| 6,862,644 B1 | 3/2005 | Pendleton et al. | |
| 7,988,063 B1 * | 8/2011 | Dufresne et al. | 236/49.3 |
| 8,107,256 B1 * | 1/2012 | Kondrat et al. | 361/796 |
| 2002/0107952 A1 * | 8/2002 | Mancusi et al. | 709/223 |
| 2003/0011332 A1 * | 1/2003 | Mays, II | 318/254 |
| 2004/0027799 A1 * | 2/2004 | King et al. | 361/687 |
| 2004/0221084 A1 * | 11/2004 | Yates et al. | 710/305 |
| 2006/0178786 A1 | 8/2006 | Bhagwath et al. | |
| 2007/0200518 A1 * | 8/2007 | Verge | 318/268 |
| 2007/0230148 A1 * | 10/2007 | Campini et al. | 361/788 |
| 2008/0126597 A1 * | 5/2008 | Hirai | 710/19 |
| 2008/0281475 A1 * | 11/2008 | Hirai et al. | 700/300 |
| 2009/0072983 A1 * | 3/2009 | Cheng et al. | 340/645 |
| 2009/0265045 A1 * | 10/2009 | Coxe, III | 700/300 |
| 2009/0299544 A1 | 12/2009 | Tanada et al. | |
| 2012/0123597 A1 * | 5/2012 | Cepulis et al. | 700/282 |

OTHER PUBLICATIONS

International Searching Authority, Internatiorlal Search Report and the Written Opinion, Aug. 2, 2010, 10 pages.

* cited by examiner

MICROCONTROLLER REGISTERS

| REGISTER NAME | ACCESS |
| --- | --- |
| ACTUAL FAN PULSE WIDTH MODULATION DUTY CYCLE | RO |
| FAN 1 TACHOMETER COUNT | RO |
| FAN 2 TACHOMETER COUNT | RO |
| FAN FAULT REGISTER | RO |
| PS STATUS REGISTER | RO |
| RESERVED | RO |
| FIRMWARE UPDATE KEYHOLE | RW |
| FAN 1 (PULSE WIDTH MODULATOR) SPEED REQUEST | RW |
| FAN 2 (PULSE WIDTH MODULATOR) SPEED REQUEST | RW |
| MAILBOX | RW |
| RESERVED | RO |

RO = READ-ONLY VIA HOST I2C
RW = READ/WRITE VIA HOST I2C

FIG. 3

METHODS AND SYSTEMS FOR AN INTERPOSER BOARD

BACKGROUND

There are many types of computer architectures. Some computer architectures combine multiple compute nodes in a shared resource enclosure. Such architectures may require customizing the power, cooling and management of each compute node being implemented in the shared resource enclosure. As an example, such customization may involve significant changes to core firmware and hardware related to the baseboard management controller (BMC) in each compute node. Such customization may have one or more of the following problems: 1) high design costs; 2) long development cycles; 3) limited choices for compute nodes due to limited resources and schedule conflicts.

BRIEF DESCRIPTION OF THE DRAWINGS

For a detailed description of exemplary embodiments of the invention, reference will now be made to the accompanying drawings in which:

FIG. 3 shows a table of microcontroller registers for an interposer programmable interface controller (PIC) in accordance with an embodiment of the disclosure.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Also, the term "server enclosure" means a server system chassis capable of hosting multiple compute nodes with common infrastructure (e.g., power supplies and fans). As used herein, a "server rack" may contain multiple of such server enclosures.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with embodiments of the disclosure, an interposer board is implemented for each of a plurality of compute nodes housed in an enclosure for a computing system (e.g., a server). Each interposer board interfaces its corresponding compute node to an aggregator backplane that manages the fans and power supplies for the server enclosure. Each interposer board provides predetermined functions that simplify the configuration of compute nodes in a server enclosure with an aggregator backplane. Without the interposer boards, each compute node would need to be designed or customized to communicate directly with the aggregator backplane. Such customization is possible, but is costly and/or results in undesirable latency in the release of new products (e.g., multi-node server enclosure and/or racks with multiple server enclosures).

Figure 1:
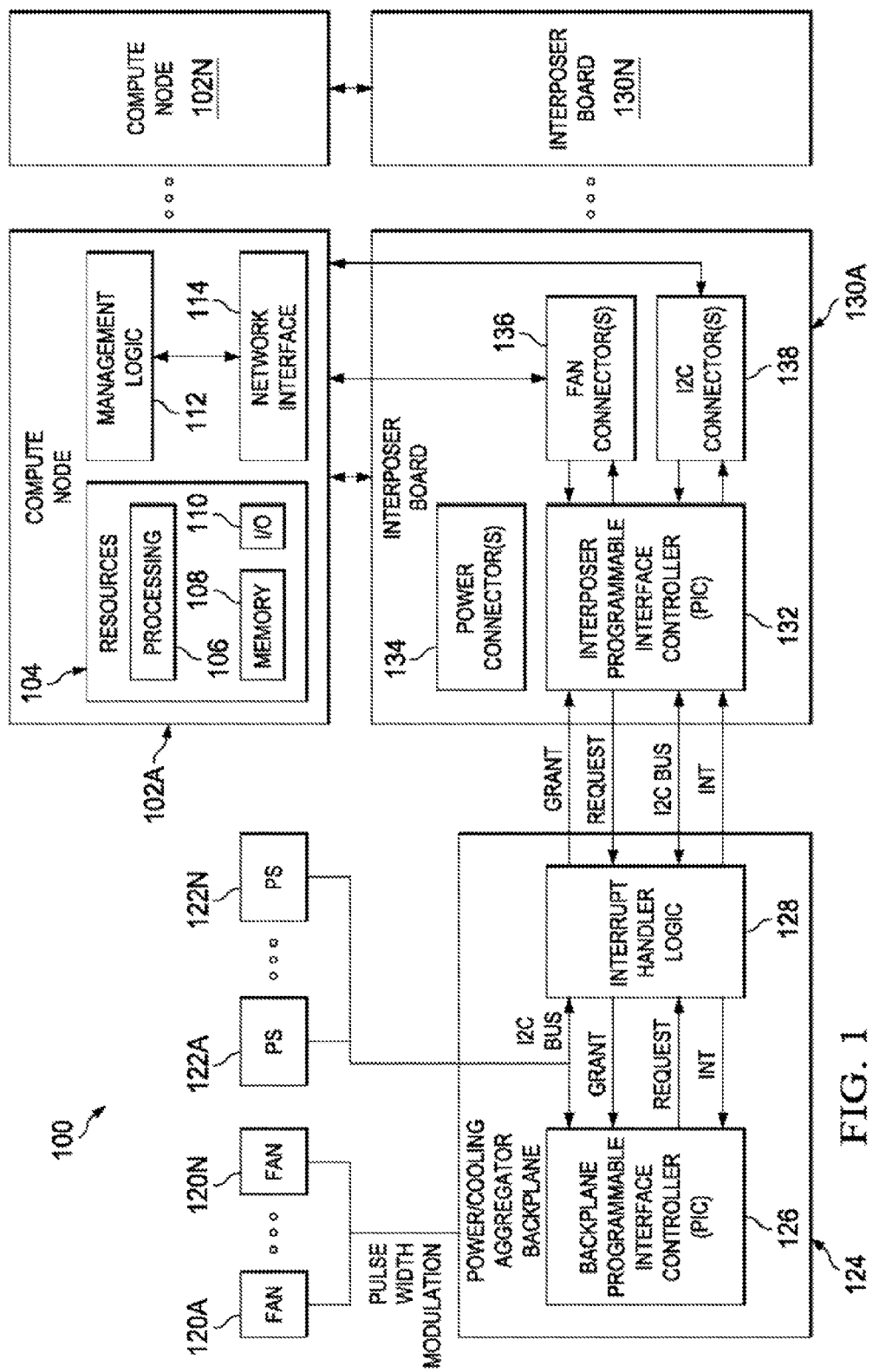
FIG. 1 illustrates a system in accordance with an embodiment of the disclosure.

FIG. 1 illustrates a system 100 in accordance with an embodiment of the disclosure. The system 100 may represent, for example, components found in a server enclosure. As shown in FIG. 1, the system 100 comprises a plurality of compute nodes 102A-102N. Each compute node 102A-102N comprises a motherboard or other printed circuit board (PCB) containing resources 104 such as any one or more of processing resources 106, memory resources 108 and input/output (I/O) resources 110. Further, each of the compute node 102A-102N may comprise a network interface 114 coupled to management logic 112. For example, the management logic 112 may monitor and/or log sensor data. In some embodiments, the management logic 112 is configured to transmit fan control signals and/or power supply control signals in response to detected temperature/electrical conditions. Further, the management logic 112 may handle remote computing requests received via the network interface 114. The management logic 122 may correspond to, for example, a baseboard management controller (BMC) known in the art.

Figure 2:
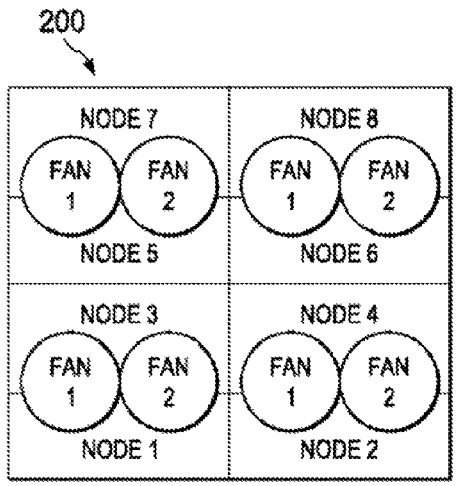
FIG. 2 illustrates a server enclosure in accordance with an embodiment of the disclosure.

In the system 100, a plurality of fans 120A-120N provide airflow/cooling for the plurality of compute nodes 102A-102N. FIG. 2 illustrates a server enclosure 200 in accordance with an embodiment of the disclosure. As shown in FIG. 2, the server enclosure 200 comprises eight compute nodes (nodes 1-8) that share a plurality of fans (e.g., fans 1-8). In general, nodes (e.g., nodes 1-8) are organized into zones, with each zone having at least one node and one fan assigned thereto. More specifically, the server enclosure 200 in the embodiment of FIG. 2 has four zones with two nodes and two fans in each zone. As shown, nodes 1 and 3 share two fans, nodes 2 and 4 share two fans, nodes 5 and 7 share two fans, and nodes 6 and 8 share two fans. Other zone configurations are possible and may vary depending on the size of the enclosure, the size of the compute nodes boards and components attached thereto, the heat generated by each compute node, the airflow provided by each fan and/or other characteristics.

Returning to FIG. 1, a plurality of power supplies 122A-122N provide power for the plurality of compute nodes 102A-102N. The fans 120A-120N and the power supplies 122A-122N are coupled to an aggregator backplane 124 that consolidates monitoring and control of the fans 120A-120N and the power supplies 122A-122N. In at least some embodiments, the aggregator backplane 124 comprises a backplane programmable interface controller (PIC) 126 (e.g., a microcontroller) coupled to interrupt handler logic 128 (e.g., a complex programmable logic device (CPLD)). The backplane PIC 126 consolidates fan status information received from the fans 120A-120N as well as power supply status information received from the power supplies 122A-122N.

The backplane PIC 126 also responds to control signals or requests for information received from the compute nodes 102A-102N.

In accordance with at least some embodiments, information and/or control signals from the aggregator backplane 124 are selectively transmitted to each of the compute nodes 102A-102N via its corresponding interposer board 130A-130N. Similarly, information and/or control signals from each of the compute nodes 102A-102N are transmitted via its corresponding interposer board 130A-130N to the aggregator backplane 124. In accordance with at least some embodiments, the interrupt handler logic 128 facilitates communications between the backplane PIC 126 and each interposer board 130A-130N using interrupt protocols.

In FIG. 1, each of the interposer boards 130A-130N comprise the same or similar components. For convenience, only the components of the interposer board 130A are shown and discussed, but it should be understood that the discussion of interposer board 130A applies to the other interposer boards (130B-130N) as well. In FIG. 1, the interposer board 130A corresponds to a printed circuit board (PCB) with an interposer programmable interface controller (PIC) 132 mounted thereon and configured to perform various functions as will be described herein. The interposer board 130A also comprises at least one power connector 134 mounted on the PCB to provide a power interface from at least one of the power supplies 122A-122N to the corresponding compute node. The power interface provided by the power connector 134 also enables the aggregator backplane 126 to monitor the power consumption of the corresponding compute node. The interposer board 130A also comprises at least one fan connector 136 mounted on the PCB and coupled to the interposer PIC 132. The fan connector 136 provides an interface for the corresponding compute node to issue fan control signals (requests) and to receive responses to such requests. The interposer board 130A also comprises a serial bus connector (e.g., an I2C bus connector) 138 mounted to the PCB and coupled to the interposer PIC 132. The serial bus connector 128 provides a serial communication interface (e.g., a single-master I2C bus) between the interposer board 130A and its corresponding compute node.

In accordance with at least some embodiments, the interposer PIC 132 translates information passed between the aggregator backplane 126 and the compute node corresponding to interposer board 130A. For example, the interposer PIC 132 may translate fan control signals from pulse width modulation (PWM) to a serial bus protocol data packet (e.g., I2C data packets). More specifically, the interposer PIC 132 may receive fan control PWM information from its corresponding compute node and provide a translated version of the fan control PWM information to the backplane PIC 126 via an I2C bus. Further, the interposer PIC 132 may translate fan status signals from Fault to Tach fan emulation. More specifically, the interposer PIC 132 may provide a fan tachometer signal to its corresponding compute node based on a PWM duty cycle and the actual fan status.

In at least some embodiments, the interposer PIC 132 receives compute node fan PWM input and digitizes the input in terms of duty cycle. The digitized duty cycle is then passed to the backplane PIC 126 via a multi-master I2C bus. As an example, a fan PWM value of 0 will represent a 0% duty cycle and 100 will represent a 100% duty cycle. Optionally, a compute node BMC may write the fan PWM settings directly to registers of the interposer PIC 132. In some embodiments, digitization of the fan PWM signals may be accomplished based on direct current (DC) conversion. In DC conversion, the PWM signal is converted to an analog DC signal and is digitized via analog-to-digital conversion. Alternatively, digitization of PWM signals may be accomplished using a timer and a capture/compare (CCP) technique. In the timer and CCP technique, the interposer PIC analyzes the PWM signal as a digital input and calculates the duty cycle using internal timers and CCP.

The interposer PIC 132 also reads system fan status information from the backplane PIC 126 via an I2C bus. Once the fan status information has been read, the interposer PIC 132 is able to generate a fan tach signal to drive a fan tach signal of a compute node. If any of the system fans fail, a tach signal is not generated by the interposer PIC 132 for the failed fan. Otherwise, the interposer PIC 132 drives the fan tach signal at a frequency corresponding to the PWM of the fan using the equation FanTachCount per Sec=(PWM_DC/100)*(MaxFanRPM/60)*(FanTachPulse/Rev), where the value of FanTachPulse/Rev is normally 2 and MaxFan RPM is the Fan RPM at 100% fan PWM duty cycle.

In at least some embodiments, the interposer PIC 132 is configured to, bridge a single-master serial bus topology (e.g., single-master I2C) for communications between the interposer board 130A and its corresponding compute node with a multi-master serial bus topology (e.g., multi-master I2C) for communications between the interposer board 130A and the aggregator backplane 126. For example, the interposer PIC 132 may provide I2C MUX arbitration based on request/grant (REQ/GNT) signals for an I2C bus. In other words, the interposer PIC 132 acts as an I2C pass thru between the BMC of a compute node and the backplane PIC 126 to avoid multi-master I2C) issues.

In relation to the bridge function, the interposer PIC 132 may also manage a traffic level for the multi-master serial bus topology. For example, in at least some embodiments, the interposer PIC 132 is configured to manage consolidation and caching of data such as fan status information, power supply status information, and power consumption meter information. Using the cached information, the interposer PIC 132 is able to selectively respond to requests from a corresponding compute node without requesting updated information from the aggregator backplane 124. For example, the interposer PIC 132 may have a traffic control timing threshold (e.g., 2 seconds) during which all requests (e.g., fan control signals, requests for information) from the compute node corresponding to the interposer board 130A are responded to from cached information within the interposer PIC 132. Once the traffic control timing threshold is reached, the interposer PIC 132 may request updated information from the aggregator backplane 124. The request for updated information may be automated or may be in response to a related request from the compute node corresponding to the interposer board 102A. Further, in at least some embodiments, the aggregator backplane 124 is able to transmit updated information to the interposer PIC 132 without waiting for the interposer PIC 132 to issue or forward a request. The traffic control timing threshold described previously may vary according to predetermined criteria (e.g., the number of compute nodes in a given system) or ongoing traffic analysis.

In at least some embodiments, the interposer PIC 132 enables flashing firmware of the backplane PIC 126 via a single-master I2C bus. For example, during the flash process, the interposer PIC 132 receives each line of code from a compute node via a single-master I2C bus and stores the code internally. The interposer PIC 132 then obtains access to the multi-master I2C bus by generating a request (REQ) and receiving a grant (GNT) from the backplane PIC 126. Once the interposer PIC 132 has mastership of the multi-master I2C bus, the line of code is passed to the backplane PIC 126 via the multi-master I2C bus and so on.

During the flash process of the backplane PIC 126, the interposer PIC 132 has full functionality. In some embodiments, the backplane PIC 126. may set the system fans to full speed with 100% duty cycle to avoid any thermal events during flashing. During the flash, the interposer PIC 132 may return predetermined values (e.g., the last known power supply status, the last known fan status, a 100% duty cycle for current fan PWM value) in response to respective requests/commands received during the flash process.

In at least some embodiments, the firmware of the interposer PIC 132 may be flashed via the single-master I2C bus as well. To perform the flash, a compute node accesses the registers of the interposer PIC 132 by writing a value to the interposer PIC Mailbox register. The compute node also writes a firmware update key to a firmware update keyhole register to put the interposer PIC in bootloader mode. In at least some embodiments, the bootloader mode of the interposer PIC 132 has various attributes. For example, the interposer PIC 132 will limit access of its registers to flash-related functions. In other words, access to non-flash related registers will be NACK'd during the bootloader mode. Once the flash process completes (e.g., usually between 30 seconds to 3 minutes), the interposer PIC 132 automatically resets itself and bring itself back on-line. The reset process may be completed in less than a second and does not require the multi-node system or any of the compute nodes to cycle power or reset. In the bootloader mode, the computer node corresponding to the interposer PIC 132 will not have access to the registers of the backplane PIC 126. However, the interposer PIC 132 continues to generate the fan tach signals at 100% PWM duty cycle for both the fans. Once the flash process completes, the interposer PIC 132 resets itself and the compute node BMC will have access to all the registers of the backplane PIC 126 again. It is expected that the BMC of the corresponding compute node will recognize the flash process of the interposer PIC 132 and avoid logging errors. If a power loss occurs during the flash process (e.g., the interposer PIC 132 loses its VDD or the PIC reset pin is asserted low for a duration that causes a PIC reset), then the interposer PIC 132 returns to the bootloader mode once power is restored. The BMC of the corresponding compute node is then able to re-start the flash process.

In FIG. 1, the interrupt handler logic 128 of the aggregator backplane 124 manages communications between the backplane PIC 126 and each interposer board 130A-130N. As shown, an I2C bus (or other serial communication bus) is utilized for communications between the backplane PIC 126 and the interrupt handler logic 128. The timing of serial communications is controlled by a grant signal (GNT), a request signal (RED) and an interrupt signal (INT). More specifically, the backplane PIC 126 may assert the REQ signal to request mastership of the I2C bus. The assertion of the REQ signal may be based on predetermined operations of the backplane PIC 126 or the INT signal being asserted by the interrupt handler logic 128 to the backplane PIC 126. In response to the REQ signal being asserted by the backplane PIC 126, the interrupt handler logic 128 selectively grants mastership of the I2C bus to the backplane PIC 126 and asserts the GNT signal to notify the backplane PIC 126 regarding the grant of mastership. In response to the GNT signal being asserted, the backplane PIC 126 is able to transmit information to the interrupt handler logic 128 via the I2C bus.

Similarly, an I2C bus (or other serial communication bus) is utilized for communications between the interrupt handler logic 128 and the interposer board 132. Again, the timing of serial communications is controlled by a grant signal (GNT), a request signal (REQ) and an interrupt signal (INT). More specifically, the interposer PIC 132 may assert the REQ signal to request mastership of the I2C bus. The assertion of the REQ signal may be based on predetermined operations of the interposer PIC 132 or the INT signal being asserted by the interrupt handler logic 128 to the interposer PIC 132. In response to the REQ signal being asserted by the backplane PIC 126, the interrupt handler logic 128 selectively grants mastership of the I2C bus to the interposer PIC 132 and asserts the GNT signal to notify the interposer PIC 132 regarding the grant of mastership. In response to the GNT signal being asserted, the interposer PIC 132 is able to transmit information to the interrupt handler logic 128 via the I2C bus. The interrupt handler logic 128 is thus able to route information from the backplane PIC 126 to each interposer board 130A-130N. Similarly, the interrupt handler logic 128 is able to route information from each interposer board 130A-130N to the backplane PIC 126.

The system 100 described for FIG. 1 may be understood as an abstraction architecture that reduces development time of a multi-node server enclosure by enabling use of available compute node boards with few, if any, modifications. Further, the fans 120A-120N of the system 100 may be, for example, Tach or Fault. Further, the power supplies 122A-122N may be industry standard or HP's "common slot" power supplies. In operation, the aggregator backplane 124 evaluates, monitors, and controls the power supplies 122A-122N and fans 120A-120N at the initial power-on of the system 100, obviating the need for any of the compute nodes 102A-102N of performing this task. The aggregator backplane 124 also performs power metering and limiting for the entire system 100 (e.g., enclosed in an enclosure) as well as for each of the compute nodes 102A-102N. The aggregator backplane 124 also steers relevant management data to and from each of the compute nodes 102A-102N via their corresponding interposer boards 130A-130N. In some embodiments, such steering of management data may be automatic and may be based on the location of each compute node 102A-102N within an enclosure. The backplane PIC 126 also controls the REQ/GNT arbitration for the multi-master I2C bus and thus is aware of which compute node is accessing its register set.

The abstraction architecture described herein greatly simplifies each compute node's BMC management support, which is normally handled through industry standard, Intelligent Platform Management Interface (IPMI) compatible Sensor Data Records (SDRs) in the BMC firmware. In accordance with at least some embodiments, each of the compute nodes 102A-102N contain an identical set of SDRs and do not have to carry multiple sets of SDRs depending on each compute node's location in the server enclosure, or in which fan zone (or power zone) a particular compute node is participating. In this manner, the complexity of designing the system 100 or another abstraction architecture system is reduced.

In the abstraction architecture of the system 100, the purpose of each interposer board 130A-130N is to simplify and adapt the power, cooling, and management signals for a single compute node into a multi-node, shared-resource architecture. For example, fan PWM outputs from a compute node are captured either as PWM signals or simple I2C bus writes by its corresponding interposer board and then converted (by an interposer PIC) to multi-master I2C bus transactions passed down to the backplane PIC 126 as fan speed requests. Further, each interposer board may retrieve and cache server management data such as power supply status (e.g., AC OK, DC OK, and redundancy status), fan status, actual fan speed, compute node power consumption, and overall chassis power consumption from the backplane PIC 126 on a periodic basis. The server management data is then quickly accessible to the BMC of the compute node corresponding to the interposer board with cached server management data. In some embodiments, sets of compute nodes (e.g., 8, 16 or more) are supported in a single enclosure. As the number of compute nodes increases in a multi-node shared resource architecture, the advantage of enabling each interposer PIC to control/minimize the traffic on the multi-master I2C bus increases as well.

In accordance with various industry standards, BMCs usually poll the status of sensors (driven by SDRs) as if the sensors were dedicated to a particular compute node. In the multi-node architecture described herein, the interposer PICS are able to limit the amount of traffic on the shared multi-master I2C bus. For example, a compute node's BMC may be configured to read fan status once per second. Meanwhile, the interposer PIC 132 is able to read fan status information from the backplane PIC 126 at a fixed slower rate (e.g., every 2 seconds). By having an interposer PIC return a locally cached copy of the fan status to the compute node's BMC, the amount of traffic to the backplane PIC 126 can be reduced without any design changes being required to the compute nodes.

FIG. 3 shows a table of microcontroller registers for an interposer PIC (e.g., interposer PIC 132) in accordance with an embodiment of the disclosure. As shown, the table comprises an actual fan PWM duty cycle register, a fan1 tachometer count register, a fan2 tachometer count register, a fan fault register, a power supply status register ("PS status register"), a firmware update keyhole register, a fan1 speed request register, a fan2 speed request register, a mailbox register, and reserved registers. In at least some embodiments, only the mailbox register is directly accessible. The remaining registers are accessible only after the mailbox register has been written to with the correct access key. The reserved registers are read-only registers that are not used at this time.

Figure 4:
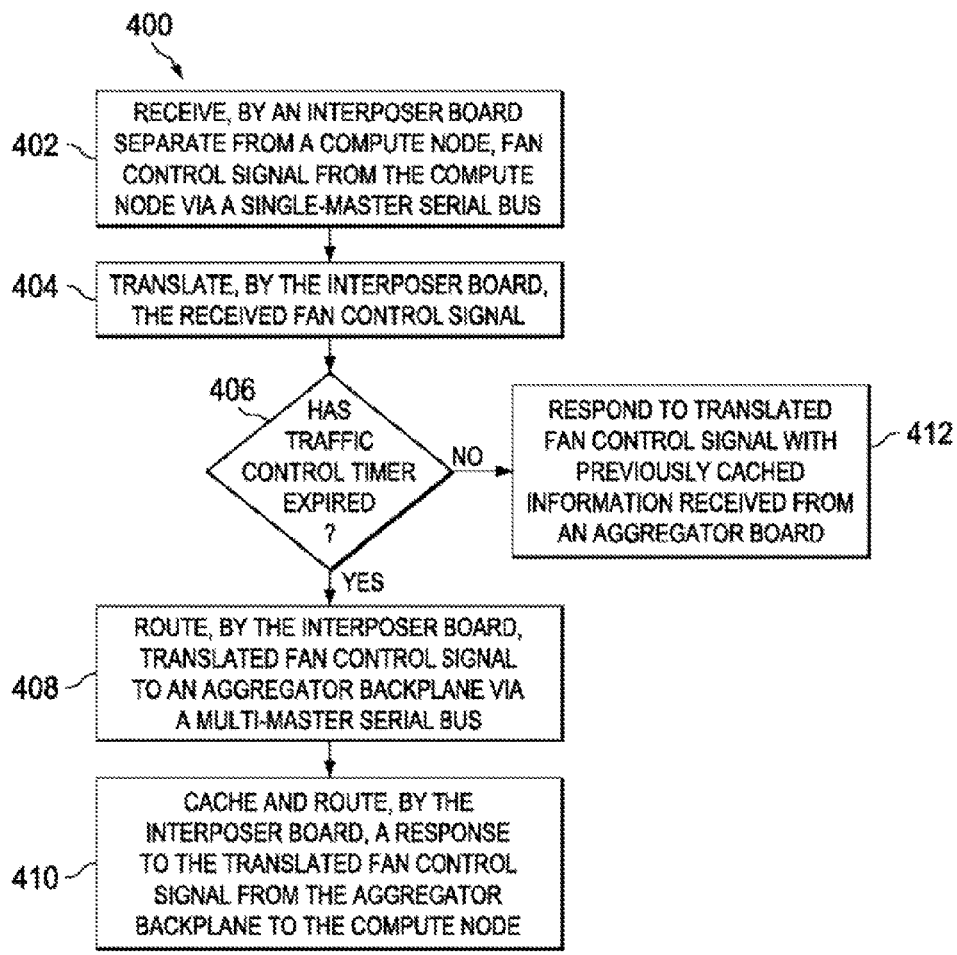
FIG. 4 illustrates a method in accordance with an embodiment of the disclosure.

FIG. 4 illustrates a method 400 in accordance with an embodiment of the disclosure. The method 400 is for interfacing a compute node with an aggregator backplane of a multi-node server. As shown, the method 400 comprises receiving, by an interposer board separate from the compute node, a fan control signal from the compute node via a single-master serial bus (block 402). At block 404, the interposer board translates the received fan control signal. In at least some embodiments, translating fan control signals comprises accessing registers of a programmable interface controller (PIC) such as an actual fan pulse width modulation (PWM) duty cycle register, a fan tachometer count register, and a fan fault register. If a traffic control timer has expired (determination block 406), the interposer board routes the translated fan control signal to an aggregator backplane via a multi-master serial bus (block 408). The routing step of block 408 comprises, for example, bridging a single-master I2C bus topology to a multi-master I2C bus topology while managing a traffic level for the multi-master I2C bus topology. The interposer board then caches and routes a response to the fan control signal from the aggregator backplane to the compute node (block 410). If the traffic control timer has not expired (determination block 408), the interposer board responds to the translated fan control signal with previously cached information received from the aggregator board (block 412).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    an aggregator backplane coupled to a plurality of fans and power supplies and configured to consolidate control and monitoring for the plurality of fans and power supplies;
    a plurality of compute nodes coupled to the aggregator backplane, wherein each compute node selectively communicates with the aggregator backplane via a corresponding interposer board,
    wherein each interposer board is configured to translate information passed between its corresponding compute node and the aggregator backplane.

2. The system as in claim 1, wherein the aggregator backplane comprises an backplane controller coupled to an interrupt handler component, wherein the backplane controller is configured to consolidate control and monitoring for the plurality of fans and power supplies and wherein the interrupt handler component is configured to handle interrupts between the backplane controller and each of the interposer boards.

3. The system as in claim 2, wherein the backplane controller comprises a backplane programmable interface controller (PIC) and the interrupt handler component comprises a complex programmable logic device (CPLD).

4. The system as in claim 1, wherein each interposer board comprises an interposer controller configured to translate fan control signals from pulse width modulation (PWM) to I2C data packets and to translate fan status signals from Fault to Tach fan emulation.

5. The system as in claim 4, wherein the interposer controller corresponds to an interposer programmable interface component (PIC) and wherein the interposer PIC is configured to manage data consolidation and caching of fan status information, power supply status information, power consumption meter information.

6. The system as in claim 5, wherein the interposer PIC is configured to bridge a single-master I2C bus topology to a multi-master I2C bus topology and to manage a traffic level for the multi-master I2C bus topology.

* * * * *